Patented Apr. 13, 1954

2,675,395

UNITED STATES PATENT OFFICE 2,675,395

COMPOUNDS OF CHOLANIC ACID SERIES AND PROCESS

Ralph F. Hirschmann, Cranford, and Norman L. Wendler, Linden, N. J., assignors to Merck & Co., Inc., Rahway, N. J., a corporation of New Jersey No Drawing. Application July 14, 1951, Serial No. 236,858

17 Claims. (Cl. 260—397.1)

1

This invention relates to compounds of the steroid series and processes useful in the preparation of steroid compounds. More particularly, it relates to an improved process for preparing 3-hydroxy-12-ketocholanic acid and derivatives thereof, as well as intermediate products useful in preparing 3-hydroxy-12-ketocholanic acid.

This application is a continuation-in-part of our copending application Serial No. 211,434, filed February 16, 1951, now abandoned.

3-hydroxy-12-ketocholanic acid and its derivatives are important compounds which are useful in the synthesis of adrenal cortical hormones, such as Kendall's Compound E (17-hydroxy-11-dehydrocorticosterone).

It is an object of the present invention to provide a process for preparing 3-hydroxy-12-ketocholanic acid and derivatives thereof. It is a further object to provide new 7-enol acylates of 3-hydroxy-7,12-diketocholanic acid which are useful intermediate compounds for preparing 3-hydroxy-12-ketocholanic acid. Another object is to provide a process for converting 7-enol acylates of 3-hydroxy-7,12-diketocholanic acid to 3-hydroxy-12-ketocholanic acid. Other objects will be apparent from the detailed description hereinafter provided.

In accordance with our invention, we have found that 3-hydroxy-7,12-diketocholanic acid, or a derivative thereof, may be readily converted to 3-hydroxy-12-ketocholanic acid or its corresponding derivatives. Suitable starting materials for our process are 3-hydroxy-7,12-diketocholanic acid, its esters, 3-acyloxy derivatives, or esterified 3-acyloxy derivatives. In carrying out our process, the starting material is reacted with an acylating agent in the presence of an acid catalyst to form the corresponding 7-enol acylate (II) which is hydrogenated to produce the corresponding 3-acyloxy-12-ketocholanic acid compound (III). This process may be represented as follows:

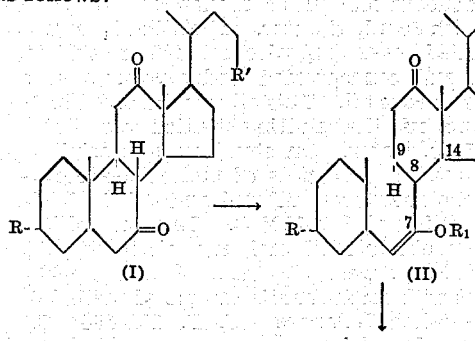

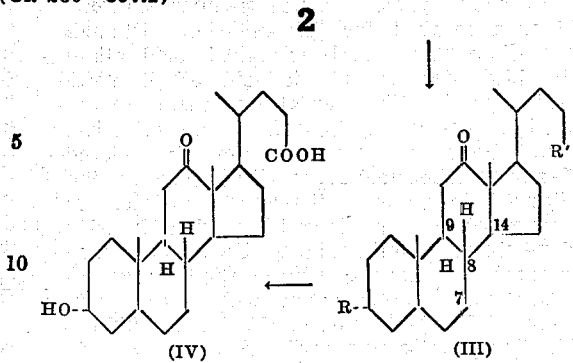

wherein R is a hydroxyl or acyloxy group, R' is a carboxyl or esterified carboxyl group, and $R_1$ is an acyl radical.

In a preferred embodiment of our invention, we utilize an ester of 3-hydroxy-7,12-diketocholanic acid or a corresponding 3-acyloxy derivative, as the starting material. Various esters of this acid, such as alkyl, aryl or aralkyl esters are useful in our process, although we usually prefer to utilize a lower alkyl ester such as the methyl or ethyl ester, since these esters are most readily prepared and conveniently used in the reaction. We have also obtained very satisfactory results with the process of our invention by utilizing an acyl derivative of a 3-hydroxy-7,12-diketocholanic acid ester wherein the 3-hydroxy group is protected by a hydrolyzable acyl substituent, for example acetyl, propionyl, butyryl, benzoyl, carbethoxy, and the like. Among the preferred starting materials in our process that might be mentioned are, methyl 3-hydroxy-7,12-diketocholanate, ethyl 3 - acetoxy - 7,12 - diketocholanate, benzyl 3 - propionoxy - 7,12 - diketocholanate, methyl 3-benzoxy-7,12-diketocholanate, propyl 3-acetoxy - 7,12 - diketocholanate, methyl 3 - carbethoxyoxy-7,12-diketocholanate, and the like.

Alternatively, 3-hydroxy-7,12-diketocholanic acid and the corresponding derivatives thereof wherein the 3-hydroxy group is protected by a hydrolyzable substituent such as an acyl group, may also be utilized as starting materials in the process of our invention. In this case when free cholanic acid is utilized as the starting material, as shown in the foregoing flow sheet, the intermediate enol acylate may be obtained in the form of the free acid shown in the flow sheet, or it is possible that under the reaction conditions a mixed anhydride resulting from the reaction of the free carboxylic acid group of the cholanic acid with the acylating agent may be formed. Also, it is possible that under the reaction conditions an anhydride is formed from two mols of the cholanic acid. However such anhydrides, if formed, would be hydrolyzed to form the free acid in the last step of the process when the acyl or ester groups are removed.

In accordance with our invention, the 3-hydroxy-7,12-diketocholanic acid or a derivative thereof is intimately contacted with an acylating agent in the presence of an acid catalyst to produce the corresponding 7-enol acylate. While various acylating agents can be used in carrying out this reaction, we have obtained particularly good results by utilizing a lower aliphatic anhydride such as acetic anhydride, propionic anhydride and the like for this purpose. Alternatively, other suitable acylating agents such as isopropenyl acetate may also be used in this step of our process. In preparing the enol acylate, we ordinarily prefer to use p-toluenesulfonic acid as a catalyst for this reaction, although other acid catalysts such as sulfuric acid, alkali metal bisulfates, phosphoric acid, alkali metal acetates and the like may also be used. In the acylation step, when the starting material has a free 3-hydroxyl group, this group is acylated to 3-acyloxy simultaneously with the conversion of the 7-keto group to the 7-enol acylate. In carrying out the acylation with acetic anhydride and p-toluenesulfonic acid, we have found that this reaction is conveniently effected by refluxing an excess of acetic anhydride with the starting material in the presence of p-toluenesulfonic acid. In order to permit the reaction to go to completion and to achieve maximum yields we find that it is advantageous to carry out this reaction under anhydrous conditions and in the absence of air.

The enol acylate formed by the process described above is readily recovered from the reaction mixture by evaporating the acylating agent. The residue so obtained, if desired, may be further purified by a chromatographic process. In this purification step the crude enol acylate is dissolved in a suitable organic solvent such as a petroleum hydrocarbon and the resulting solution is passed through a column of alumina. Upon eluting the column with a portion of the same solvent and evaporating the eluate, a residue consisting essentially of enol acylate is obtained.

In order to convert the 7-enol acylate to a 3-acyloxy-12-ketocholanic acid compound, it is reacted with hydrogen in the presence of a hydrogenation catalyst. We have found that this reaction is most conveniently effected in a suitable medium such as acetic acid. While various hydrogenation catalysts are useful in carrying out this step of our process, we prefer to use a noble metal catalyst such as platium for this purpose. After the hydrogenation is complete, the catalyst is removed and the resulting solution is concentrated to obtain a residue consisting of the crude 3-acyloxy-12-ketocholanic acid compound.

The acylated 3-hydroxy-12-ketocholanic acid or ester so obtained is readily hydrolyzed to obtain 3-hydroxy-12-ketocholanic acid by alkaline or acid hydrolysis in accordance with procedures known in the art.

It was indeed surprising and unexpected to find that enol acylation proceeds selectively at the 7-carbonyl position and that the 12-keto group remains entirely unaffected. Thus, for example, in the acylation procedure, only the keto group in the 7-position is converted to the corresponding enol acylate. It might have been anticipated that under the reaction conditions the keto group in the 12-position would also react to form the corresponding 12-enol acylate. Further, in the hydrogenation step of our process it was surprising to find that the 7-enol acylate group was reduced and the 12-keto group remains substantially unaffected.

The following examples are presented to illustrate specific embodiments of our invention.

Example 1

To a solution of 3.5 g. (0.0076 mole) of methyl 3($\alpha$)-acetoxy-7,12-diketocholanate (M. P. 161.4–161.8° C.) in 280 cc. of distilled acetic anhydride was added 1.45 g. (0.0076 mole) of p-toluenesulfonic acid monohydrate. The mixture was heated in an atmosphere of nitrogen to permit the slow distillation of acetic anhydride and acetic acid. When the volume of the reaction mixture had been reduced to about 50 cc. (after three and one-half hours of heating) the residual amount of acetic anhydride was removed under reduced pressure. The dark residue was taken up in ether and washed successively with three portions each of cold water (which removed most of the color), a cold solution of 1 N sodium carbonate, and finally with water. After washing with a saturated solution of sodium chloride, the ethereal solution was dried over sodium sulfate. Removal of the solvent afforded a viscous oil which was taken up in about 155 cc. of Skellysolve B (a petroleum hydrocarbon fraction), passed through a column of 28 g. of acid-washed alumina and eluted with a total of 700 cc. of Skellysolve B. From the first three fractions the 7-enol acetate of methyl 3($\alpha$)-acetoxy-7,12-diketo-cholanate was obtained as a colorless crystalline solid in about 40% yield having a melting point ranging from 121–122° C. to 117–121° C. An analytical sample, M. P. 123–124° C. obtained by crystallization from Skellysolve B, gave the correct analysis for the monoenol acetate.

Calc'd. for $C_{29}H_{42}O_7$: C, 69.29; H, 8.42. Found: C, 69.41; H, 8.39.

Example 2

5 g. of the 7-enol acetate of methyl 3-acetoxy-7,12-diketocholanate (M. P. 119.6–121° C.) were dissolved in 100 cc. glacial acetic acid, 1 g. platinum oxide catalyst was added and the resulting mixture was hydrogenated at a hydrogen pressure of 40 pounds per square inch at room temperature. When 2 moles of hydrogen had been absorbed after 1 hour, the hydrogenation was stopped. The catalyst was then removed by vacuum filtration, and the clear, colorless filtrate was concentrated to dryness under vacuum. The gummy residue obtained was dissolved in 100 cc. ether and the ether solution was washed with three 30 cc. portions of water, one 30 cc. portion of 1 N aqueous sodium bicarbonate solution, and finally with 30 ml. of water. The ether layer was then dried over anhydrous sodium sulfate, filtered, and concentrated under vacuum to a colorless viscous oil. This oil was dissolved in 25 cc. ethanol and the resulting solution was diluted with 8.5 cc. water. On standing, a precipitate settled out. The crystals of methyl 3-acetoxy-12-ketocholanate were filtered and dried. Yield 1.2 g., melting at 133–138° C. On recrystallization from absolute ethanol, crystals melting at 149.5–150.5° C. were obtained. A mixed melting point with an authentic sample of methyl 3-acetoxy-12-ketocholanate (M. P. 151–154° C.) showed no depression.

The methyl 3-acetoxy-12-ketocholanate may be hydrolyzed with acid to obtain 3-hydroxy-12-ketocholanic acid.

Example 3

10 g. of methyl 3-carbethoxyoxy-7,12-diketocholanate was dissolved in 200 cc. acetic anhydride, 3.8 g. p-toluenesulfonic acid was added, and the reaction mixture was heated to reflux. The mixture was then distilled slowly over a period of 19 hours to remove volatile substances, and the remaining acetic anhydride was removed by concentration in vacuo. The residue was dissolved in 100 cc. ether, and the ether solution was washed with four 50 cc. portions of cold water, one 50 cc. portion of 1 N aqueous sodium carbonate solution and finally with two 50 cc. portions of water. The washed ether extract was dried over anhydrous sodium sulfate, and the ether was removed in vacuo. The oily residue obtained was dissolved in a 70-30 mixture of Skellysolve C-benzene (Skellysolve C is a commercial hexane fraction from petroleum), and the solution was subjected to a chromatographic purification treatment through a column of acid-washed alumina. The 7-enol acetate of methyl 3-carbethoxyoxy-7,12-diketocholanate was obtained in crystalline form from the eluted fractions, and had a melting point of 111.5-113° C., $[\alpha]_D^{25} + 112.4°$ (1% chloroform). Molecular weight: 533.

*Analysis.*—Calc'd. for $C_{30}H_{45}O_8$: C, 67.60; H, 8.44. Found: C, 67.48; H, 8.24.

Example 4

10 g. of methyl 3-carbethoxyoxy-7,12-diketocholanate was dissolved in 50 cc. isopropenyl acetate, and 0.75 g. p-toluenesulfonic acid monohydrate was added. The reaction mixture was heated to reflux for 3 hours, and was then slowly distilled, first at atmospheric pressure and then in vacuo, to remove the excess isopropenyl acetate. The residue was dissolved in 50 cc. ether, and the ether solution was washed with three 25 cc. portions of water, one 25 cc. portion of aqueous 1 N sodium carbonate solution, and finally with one 25 cc. portion of water. The washed ether solution was dried over anhydrous sodium sulfate, and the ether was removed in vacuo. The oily residue was dissolved in 50 cc. methanol and upon seeding, the 7-enol acetate of methyl 3-carbethoxyoxy - 7,12 - diketocholanate was obtained in crystalline form and was found to be identical with the product obtained in Example 3.

Example 5

10 g. methyl 3-hydroxy-7,12-diketocholanate was dissolved in 880 cc. of acetic anhydride, and 4.54 g. p-toluenesulfonic acid monohydrate was added. The reaction mixture was heated to reflux, and then slowly distilled for 3½ hours, after which the remaining acetic anhydride was removed in vacuo. The residue was dissolved in 75 cc. ether, and the ether solution was washed with three 20 cc. portions of water, one 25 cc. portion of aqueous 1 N sodium carbonate solution and several portions of water. The washed ether solution was dried over anhydrous sodium sulfate, filtered, and the ether removed in vacuo. The residue was dissolved in a mixture of benzene and petroleum ether, and subjected to chromatographic purification. From the eluted fractions, the 7-enol acetate of methyl 3-acetoxy-7,12-diketocholanate was obtained in crystalline form. Melting point: 119.2-120.8° C.

Various changes and modifications may be made in carrying out the present invention without departing from the spirit and scope thereof. Insofar as these changes and modifications are within the purview of the annexed claims, they are to be considered as part of our invention.

We claim:

1. The process that comprises reacting a compound having the formula:

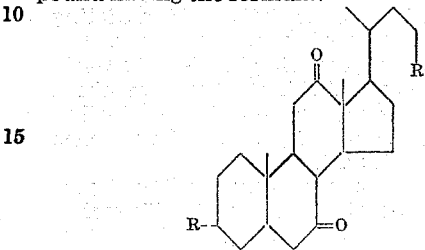

wherein R is a radical selected from the group consisting of hydroxyl and acyloxy and R' is a radical selected from the group consisting of carboxy and esterified carboxy, with a lower fatty acid acylating agent in the presence of an acid catalyst to form the corresponding 7-enol acylate, and reacting said 7-enol acylate with hydrogen in the presence of a hydrogenation catalyst to obtain a compound of the formula:

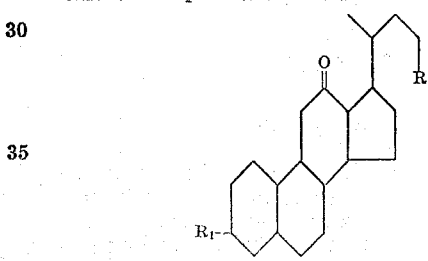

wherein $R_1$ is an acyloxy group.

2. The process that comprises reacting an ester of 3-hydroxy-7,12-diketocholanic acid with a lower fatty acid acylating agent in the presence of an acid catalyst to form the 7-enol acylate of the 3-acyloxy-7,12-diketacholanic acid ester, and reacting said enol acylate with hydrogen in the presence of a hydrogenation catalyst to obtain the corresponding ester of 3-acyloxy-12-ketocholanic acid.

3. The process that comprises reacting an ester of 3-acyloxy-7,12-diketocholanic acid with a lower fatty acid acylating agent in the presence of an acid catalyst to form the corresponding 7-enol acylate, and reacting said enol acylate with hydrogen in the presence of a hydrogenation catalyst to obtain the corresponding ester of 3-acyloxy-12-ketocholanic acid.

4. The process that comprises reacting methyl 3-acetoxy-7,12-diketocholanate with acetic anhydride in the presence of p-toluenesulfonic acid to form the corresponding 7-enol acetate, and reacting said enol acetate with hydrogen in the presence of platinum oxide to obtain methyl 3-acetoxy-12-ketocholanate.

5. The process for preparing a 7-enol acylate of a 3-acyloxy-7,12-diketocholanic acid ester which comprises reacting the corresponding ester of a 3-hydroxy-7,12-diketocholanic acid with a lower fatty acid acylating agent in the presence of an acid catalyst.

6. The process for preparing the 7-enol acetate of methyl 3-acetoxy-7,12-diketocholanate which comprises reacting methyl 3-hydroxy-7,12-diketocholanate with acetic anhydride in the presence of p-toluenesulfonic acid.

7. The process for preparing a 7-enol acylate of a 3-acyloxy-7,12-diketocholanic acid which comprises reacting the corresponding 3-acyloxy-7,12-diketocholanic acid ester with a lower fatty acid acylating agent in the presence of an acid catalyst.

8. The process for preparing the 7-enol acylate of methyl 3-acetoxy-7,12-diketocholanate which comprises reacting methyl 3-acetoxy-7,12-diketocholanate with a lower fatty acid acylating agent in the presence of an acid catalylst.

9. The process for preparing the 7-enol acetate of methyl 3-acetoxy-7,12-diketocholanate which comprises reacting methyl 3-acetoxy-7,12-diketocholanate with acetic anhydride in the presence of p-toluenesulfonic acid.

10. The process for preparing the 7-enol acetate of methyl 3-carbethoxyoxy-7,12-diketocholanate which comprises reacting methyl 3-carbethoxyoxy-7,12-diketocholanate with isopropenyl acetate in the presence of p-toluenesulfonic acid.

11. The process which comprises reacting a compound of the formula:

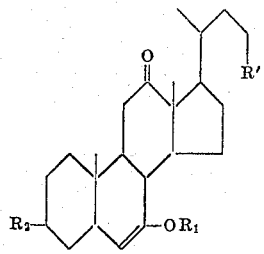

wherein $R_2$ is an acyloxy group, $R'$ is an esterified carboxy group, and $R_1$ is a lower fatty acid radical, with hydrogen in the presence of a hydrogenation catalyst to obtain a compound of the formula:

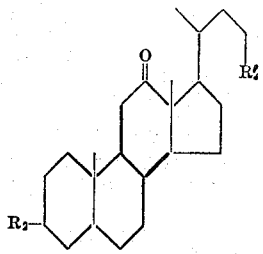

12. The process that comprises reacting the 7-enol acetate of methyl 3-acetoxy-7,12-diketocholanate with hydrogen in the presence of platinum oxide to form methyl 3-acetoxy-12-ketocholanate.

13. A compound of the formula:

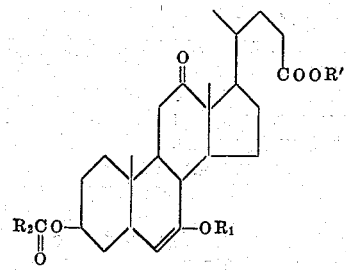

wherein $R_2$ is a member from the group consisting of lower alkyl and lower alkoxy groups, $R_1$ is a lower fatty acid radical, and $R'$ is a lower alkyl group.

14. The 7-enol acetate of methyl 3-acetoxy-7,12-diketocholanate.

15. The 7-enol acetate of methyl 3-carbethoxy-oxy-7,12-diketocholanate.

16. The process that comprises reacting an ester of 3-hydroxy-7,12-diketocholanic acid with a lower aliphatic acid anhydride in the presence of an acid catalyst to form the corresponding 7-enol acylate of the 3-acyloxy-7,12-diketocholanic acid ester, and reacting said enol acylate with hydrogen in the presence of a hydrogenation catalyst to obtain the corresponding ester of 3-acyloxy-12-ketocholanic acid.

17. The process which comprises reacting an ester of 3-hydroxy-7,12-diketocholanic acid with a lower aliphatic acid anhydride in the presence of an acid catalyst to form the corresponding 7-enol acylate of the 3-acyloxy-7,12-diketocholanic acid ester.

No references cited.